June 2, 1953  E. R. AMES ET AL  2,640,290
HOOK SETTER FOR FISHING TACKLE
Filed June 5, 1950
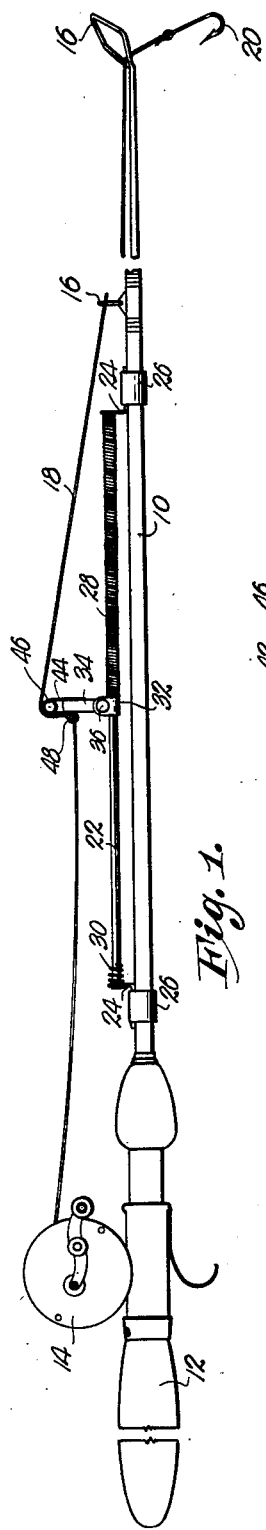
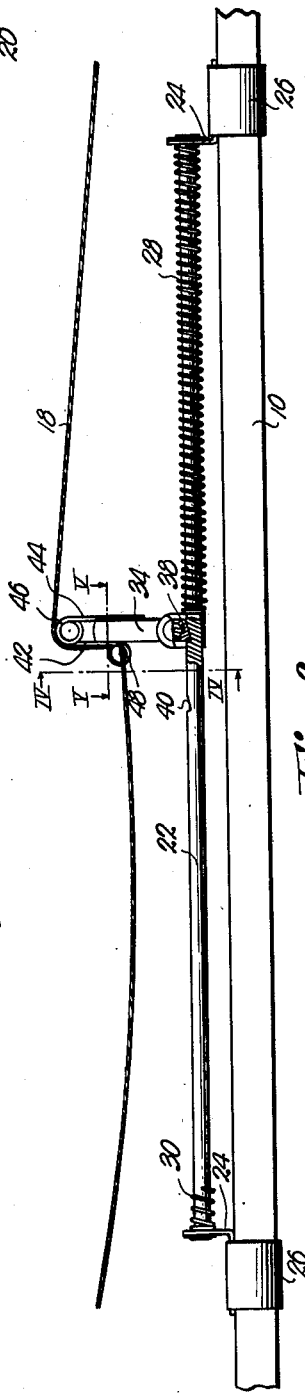
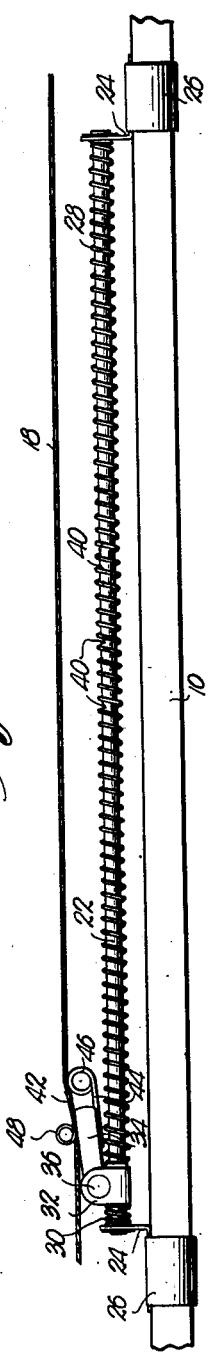
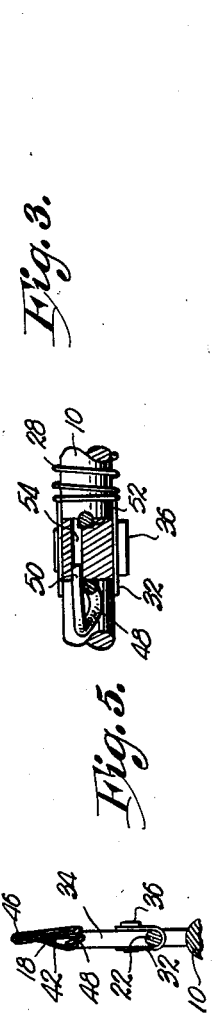
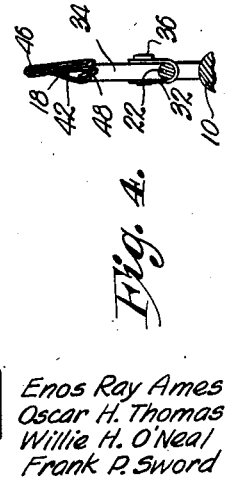
Enos Ray Ames
Oscar H. Thomas
Willie H. O'Neal
Frank P. Sword
INVENTORS.
BY
ATTORNEY.

Patented June 2, 1953

2,640,290

UNITED STATES PATENT OFFICE 2,640,290

HOOK SETTER FOR FISHING TACKLE

Enos Ray Ames, Oscar H. Thomas, Willie H. O'Neal, and Frank P. Sword, Wichita, Kans.

Application June 5, 1950, Serial No. 166,202

1 Claim. (Cl. 43—15)

This invention has to do with fishing equipment and relates particularly to an attachment for fishing poles or other supports and releasably attached to a fishing line for imparting a jerking motion thereto as soon as the fish strikes the hook, thereby automatically and positively setting the hook with assurance that the fish is definitely snared.

It is the most important object of the present invention to provide a hook setter including an elongated guide rod having a spring coiled thereabout and a trigger assembly for holding the the spring compressed, the fishing line being connected directly with the trigger whereby as the trigger is released through a strike by the fish, the spring acts upon the trigger and causes a jerking of the line and the hook to set the latter in the mouth of the fish.

Another important object of the present invention is to provide a hook setter having novel means of attachment for the line to the trigger that is quickly releasable, permitting the fisherman to "reel in" after the hook has been set without the necessity of manually releasing the line from the device forming the subject matter hereof.

Other objects of the present invention include the way in which the trigger is swingably mounted on a reciprocable follower; the manner in which a detent is formed on the swingable trigger for releasable locking with a notch in the guide bar for the follower; the manner of providing resilient structure on the trigger and including a coil spring for releasably holding the fishing line secured to the trigger; and many more minor objects, all of which will be made clear or become apparent as the following specification progresses, reference being had to the accompanying drawing, wherein:

Figure 1 is a side elevational view of a hook setter for fishing tackle made in accordance with our present invention.

Fig. 2 is an enlarged, fragmentary, side elevational view thereof.

Fig. 3 is an enlarged, fragmentary, side elevational view differing from Figs. 1 and 2 in that the trigger assembly is shown in the released condition.

Fig. 4 is a detailed, cross-sectional view taken on line IV—IV of Fig. 2; and

Fig. 5 is an enlarged, detailed, cross-sectional view taken on line V—V of Fig. 2.

The hook setter of this invention is illustrated in the drawing attached to an elongated fishing rod 10, but as will hereinafter become apparent, the entire structure may be supported by any other suitable means such as a stick, pole or even a branch of a tree.

Rod 10 is of conventional character in that the same is provided with a hand-grip 12 at one end thereof, a reel 14 releasably secured to the rod 10 adjacent the grip 12, and eyelets 16 for receiving the fishing line 18. Line 18 is coiled about the drum of reel 14 and has a hook 20 secured to one end thereof. The attachment hereof includes an elongated guide bar 22 that is preferably circular in cross-section as illustrated in Fig. 4.

A pair of identical L-shaped brackets 24 are secured directly to the guide bar 22 at opposite ends thereof, said brackets 24 serving as a means of attachment of the guide bar 22 to the rod 10.

Conventional wrappings 26 are shown as one means of securing brackets 24 in place upon rod 10, but screws or other fixtures may be utilized if desired. Similarly, if the bar 22 is to be supported by structure other than a fishing rod as above indicated, then the means of attachment for brackets 24 will vary accordingly. One of the brackets 24 remote from the hand-grip 12, serves as a stop for an elongated spring 28 coiled about the bar 22. Similarly, the opposite bracket 24 acts as a stop for a bumper 30 that also constitutes a relatively short spring coiled about the guide bar 22 in opposed relationship to the coil spring 28.

A U-shaped clip or follower 32 is partially looped about the bar 22 for free longitudinal reciprocation therealong. An elongated trigger 34 is disposed between the legs of the clip or follower 32 and swingably secured thereto by means of a pivot pin 36 that interconnects the aforesaid legs of follower 32. That end of the trigger 34 on one side of the swinging axis 36 and adjacent the guide bar 22, is provided with a detent 38 adapted to be received by any one of a number of notches 40 formed in the guide bar 22 intermediate the ends thereof. It is noted in Fig. 2 of the drawing that the detent 38 is seated within one of the notches 40 only when the trigger 34 is swung to the position illustrated in said figure and disposed substantially perpendicular to the longitudinal axis of the guide bar 22. However, when the trigger 34 is swung with respect to the follower 32 to the position illustrated in Fig. 3 of the drawing, in partial overlying relationship to the coil spring 28, detent 38 is moved to a retracted position with respect to the notches 40.

A novel means for releasably attaching the line 18 to the trigger 34 at the free end thereof opposite to the detent 38, includes an initially straight length of resilient wire that is bent to form a pair of spaced, substantially parallel legs 42 and 44 and a relatively short coil spring 46 at the bight or point of connection between legs 42 and 44. Leg 42 is additionally bent into a single coil 48 intermediate the ends thereof and the free end of the leg 42 extends laterally at right angles to leg 42 as at 50.

An elongated groove 52 formed in one edge of the trigger 34 and extending longitudinally therealong, receives the leg 44 while the leg 42 bears against the opposite edge of trigger 34 adjacent the outermost free end of the latter. A transverse opening 54 formed in the trigger 34 in spaced relationship to the free end of the latter, slidably receives the extension 50 of leg 42.

From the reel 14, the line 18 is threaded adjacent the coil 48 between leg 42 and the proximal edge of the trigger 34 and by virtue of the fact that legs 42 and 44 are biased toward each other, the line is releasably held in place. Outward movement of the leg 42 away from the leg 44 to permit insertion of the line 18 as just above described, is permitted by virtue of the movement of extension 50 within opening 54. This extension 50 also serves to hold the line 18 against movement toward the coil spring 46 and in threaded relationship with respect to the legs 42 and 44. From the coil 48 and proximal end of leg 42, the line 18 is extended upwardly and threaded between two of the convolutions of coil spring 46, whereupon the line 18 extends forwardly with respect to the rod 10 and through the eyelets 16 thereof.

In operation, the assembly is normally not placed in use until after the fisherman has made his cast. Thereupon, the follower 32 is moved away from the bumper 30 and against the coil spring 28 by grasping the trigger 34 while the same is in the position illustrated in Fig 3 of the drawing. Trigger 34 is then swung from the substantially horizontal position of Fig. 3, to the upright position of Fig. 2 to move the detent 38 thereof into one of the notches 40. Such locking engagement between detent 38 and the guide bar 22, holds the spring 28 in a compressed condition as illustrated in Figs. 1 and 2. The fisherman thereupon threads the line 18 in the manner fully described above.

As soon as a pull is exerted upon the line 18 such as by a fish striking the hook 20, such pull will cause the trigger 34 to swing from the position shown in Figs. 1 and 2, to the position illustrated in Fig. 3, thereby releasing detent 38 from its engaged notch 40. This releasing will permit the compressed spring 28 to act upon the follower 32 and cause the same to move quickly and with a jerk toward the bumper 30. Movement of the follower 32 carries trigger 34 therewith and exerts a pull upon the line 18 that is sufficient to set hook 20 in the mouth of the striking fish. The fisherman can thereupon immediately commence operating the reel 14 and continue pulling upon the line 18 for as soon as the line 18 is reeled in, it will automatically and easily release itself with respect to the leg 42 at coil 48 and with respect to the convolutions of coil spring 46.

It is seen that this automatic releasing means on trigger 34 for line 18, is highly important since in the absence of structure to eliminate the necessity of manual release of the line 18, the ensnared fish would have opportunity to release himself from the hook 20 because of the slack in line 18. Through use of the hook setter hereof however, no time is lost and the fisherman can immediately continue inward pulling on the line 18 after the same has been initially jerked by action of spring 28, thereby maintaining the line taut and preventing any slack therein that would afford an opportunity for the fish to cause slacking of the line and permit his release from the hook 20.

It is a common occurrence for a fisherman to lose his catch because of the fact that the fish fighting the hook 20, jerks upon the line, thereby breaking the same. To overcome this difficulty, the fisherman commonly grasps the line with one hand to maintain the same tautness, while giving the fish sufficient slack each time jerking occurs. This practice usually overcomes the difficulty, but it is impossible to grasp the line quickly enough after the strike to prevent line breakage as a result of a jerk occurring immediately after the strike.

Through use of the hook setter hereof, as soon as the trigger 34 is released and the line 18 jerked to set the hook 20, coil spring 28 immediately serves as a shock absorber to relieve the jerking by the fish before the fisherman is able to grasp the line 18 or the reel 14 and release the line 18 from trigger 34. By virtue of the coil spring 46 disposed at the outermost free end of the trigger 34, sufficient leverage is presented to cause a release with the slightest pull upon line 18. However, by virtue of the provision of a number of notches 40, the tension upon spring 28 can be varied and further by varying the depth of the notches 40, the fisherman can adapt the hook setter to the type of fishing and with respect to the size of the fish to be caught or the nature of the stream or other water where fishing takes place.

Manifestly, many details of construction may be varied within the spirit of this invention and further, the device may be placed in use whenever it is necessary to automatically impart a jerking motion to any line or cable other than in the field of fishing equipment.

Accordingly, it is desired to be limited only by the scope of the appended claim.

Having thus described the invention, what is claimed as new and desired to be secured by Letters Patent is:

For fishing tackle including a pole, a line, and a hook on the line, an attachment for automatically setting said hook in the mouth of a fish as the latter grasps the hook and pulls upon said line, said attachment comprising an elongated guide bar having an L-shaped bracket on each end respectively thereof, each adapted for rigid connection to the pole for holding the bar against movement with respect to the rod, in spaced parallelism thereto and superimposed thereabove; a long actuating spring and a short bumper spring coiled on the bar between the brackets; a U-shaped follower clip partially surrounding the bar between the springs for reciprocation longitudinally of the bar, said clip having a pair of spaced legs; an elongated trigger between the legs of said clip; a pin interconnecting said legs above the bar and passing through the trigger, pivotally mounting the latter for swinging movement to and from a position overlying a portion of said actuating spring, said trigger having a detent on one side of the pin, said bar having a detent-receiving notch intermediate the ends thereof, normally facing upwardly, said trigger extending upwardly in perpendicular relationship to the bar when the detent is in the notch, said actuating spring being compressed between the clip and one of the brackets when the detent is in the notch; and means on that end of the trigger opposite to the detent for fastening the line to the trigger, whereby when a fish pulls the line to swing the trigger to said position, the detent is released from the notch and the line is jerked as the actuating spring forces the clip along the bar to a position compressing the bumper spring between the clip and the other bracket.

ENOS RAY AMES.
OSCAR H. THOMAS.
WILLIE H. O'NEAL.
FRANK P. SWORD.

References Cited in the file of this patent

UNITED STATES PATENTS

| Number    | Name      | Date          |
|-----------|-----------|---------------|
| 671,914   | Nesbit    | Apr. 9, 1901  |
| 840,598   | Tuttle    | Jan. 8, 1907  |
| 1,934,536 | Hawkinson | Nov. 7, 1933  |
| 1,989,407 | Ezell     | Jan. 29, 1935 |
| 2,495,572 | Deutsch   | Jan. 24, 1950 |

FOREIGN PATENTS

| Number  | Country | Date          |
|---------|---------|---------------|
| 606,406 | France  | June 14, 1926 |
| 638,747 | France  | June 1, 1928  |